US012136505B2

(12) United States Patent
Yamasaki et al.

(10) Patent No.: US 12,136,505 B2
(45) Date of Patent: Nov. 5, 2024

(54) WIRING MEMBER

(71) Applicant: Sumitomo Wiring Systems, Ltd., Mie (JP)

(72) Inventors: Jun Yamasaki, Mie (JP); Masaki Mizushita, Mie (JP); Yoshiaki Tanaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 192 days.

(21) Appl. No.: 17/924,050

(22) PCT Filed: May 7, 2021

(86) PCT No.: PCT/JP2021/017487
§ 371 (c)(1),
(2) Date: Nov. 8, 2022

(87) PCT Pub. No.: WO2021/241163
PCT Pub. Date: Dec. 2, 2021

(65) Prior Publication Data

US 2023/0260677 A1 Aug. 17, 2023

(30) Foreign Application Priority Data

May 25, 2020 (JP) ................................ 2020-090588

(51) Int. Cl.
*H01B 7/40* (2006.01)
*H01B 7/08* (2006.01)
*H01B 13/012* (2006.01)

(52) U.S. Cl.
CPC ..................................... *H01B 7/40* (2013.01)

(58) Field of Classification Search
CPC .......... H01B 7/40; H01B 7/08; H01B 7/0846; H01B 7/0823; H01B 13/01254; B60R 16/0207; B60R 16/0215
See application file for complete search history.

(56) References Cited

U.S. PATENT DOCUMENTS 3,733,428 A * 5/1973 Fry ...................... H01B 7/0846 156/290
4,845,315 A * 7/1989 Stopper .................. H05K 1/147 174/117 FF (Continued)

FOREIGN PATENT DOCUMENTS

JP 62-256492 11/1987
JP 2019-207816 12/2019

(Continued)

OTHER PUBLICATIONS

International Search Report issued in International Pat. Appl. No. PCT/JP2021/017487, dated Jul. 13, 2021, along with an English translation thereof.

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes: a sheet; a plurality of first wire-like transmission members disposed on the sheet; and at least one second wire-like transmission member intersecting with at least two of the plurality of first wire-like transmission members. A length dimension of the first intersection section where the second wire-like transmission member intersects with each of at least two of the plurality of first wire-like transmission members is larger than a maximum fixation interval except for the first intersection section in a fixation interval of the second wire-like transmission member. The second wire-like transmission member is located closer to a side of the sheet in relation to at least two of the plurality of first wire-like transmission members in the first intersection section.

8 Claims, 3 Drawing Sheets

(56) References Cited

U.S. PATENT DOCUMENTS

| | | | | |
|---|---|---|---|---|
| 2017/0327060 | A1 | 11/2017 | Nakajima | |
| 2021/0210250 | A1* | 7/2021 | Nishimura | H01B 7/08 |
| 2021/0225556 | A1 | 7/2021 | Aramaki et al. | |

FOREIGN PATENT DOCUMENTS

| | | |
|---|---|---|
| WO | 2016/098657 | 6/2016 |
| WO | 2019/230081 | 12/2019 |
| WO | 2020/026782 | 2/2020 |

* cited by examiner

WIRING MEMBER

TECHNICAL FIELD

The present disclosure relates to a wiring member.

BACKGROUND ART

Patent Document 1 discloses a wiring member including a sheet material and a plurality of insulating wires disposed to have an intersection part on a main surface of the sheet material.

PRIOR ART DOCUMENTS

Patent Document(s)

Patent Document 1: Japanese Patent Application Laid-Open No. 2019-207816

SUMMARY

Problem to be Solved by the Invention

A wire-like transmission member is desired to be detached more hardly from a sheet in a wiring member having an intersection part on the sheet.

Accordingly, an object is to provide a technique of detaching a wire-like transmission member more hardly from a sheet in a wiring member having an intersection part on the sheet.

Means to Solve the Problem

A wiring member according to the present disclosure is a wiring member including: a sheet; a plurality of first wire-like transmission members disposed on the sheet; and at least one second wire-like transmission member intersecting with at least two of the plurality of first wire-like transmission members, wherein defined as a first intersection section is a section of connecting, by the second wire-like transmission member, two intersection parts located on both ends of the second wire-like transmission member in a longitudinal direction in at least two intersection parts in which each of the at least two of the plurality of first wire-like transmission members intersect with the second wire-like transmission member, the second wire-like transmission member is fixed to the sheet at a plurality of positions at intervals along the longitudinal direction, a length dimension of the first intersection section is larger than a maximum fixation interval except for the first intersection section in a fixation interval of the second wire-like transmission member, and the second wire-like transmission member is located closer to a side of the sheet in relation to the at least two of the plurality of first wire-like transmission members in the first intersection section.

Effects of the Invention

According to the present disclosure, the wire-like transmission member is detached more hardly from the sheet in the wiring member having the intersection part on the sheet.

DESCRIPTION OF EMBODIMENT(S)

Description of Embodiment of Present Disclosure

Figure 1:
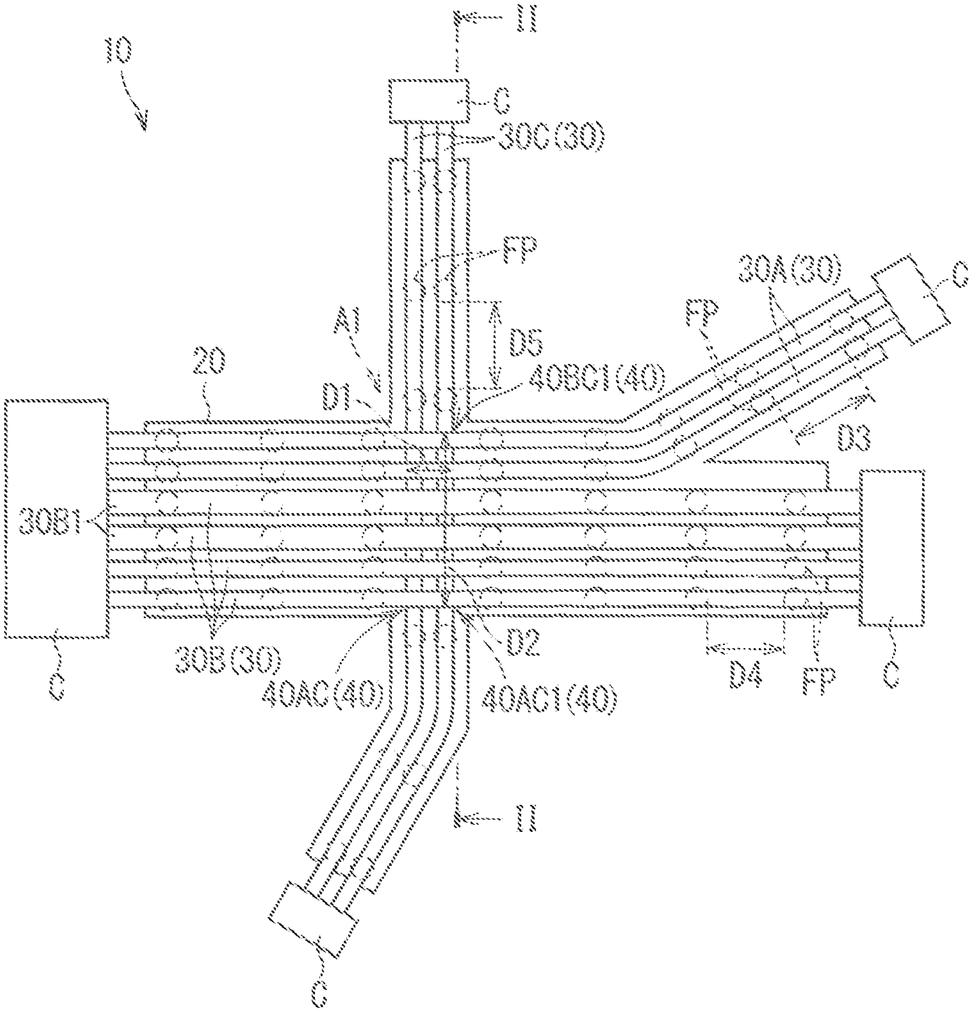
FIG. 1 is a plan view illustrating a wiring member according to an embodiment 1.

Embodiments of the present disclosure are listed and described firstly.

A wiring member according to the present disclosure is as follows.

(1) A wiring member includes: a sheet; a plurality of first wire-like transmission members disposed on the sheet; and at least one second wire-like transmission member intersecting with at least two of the plurality of first wire-like transmission members, wherein defined as a first intersection section is a section of connecting, by the second wire-like transmission member, two intersection parts located on both ends of the second wire-like transmission member in a longitudinal direction in at least two intersection parts in which each of the at least two of the plurality of first wire-like transmission members intersect with the second wire-like transmission member, the second wire-like transmission member is fixed to the sheet at a plurality of positions at intervals along the longitudinal direction, a length dimension of the first intersection section is larger than a maximum fixation interval except for the first intersection section in a fixation interval of the second wire-like transmission member, and the second wire-D mission member is located closer to a side of the sheet in relation to the at least two of the plurality of first wire-like transmission members in the first intersection section. Accordingly, the second wire-like transmission member is hardly detached from the sheet in the first intersection section.

(2) In the wiring member according to (1), a portion where the second wire-like transmission member is fixed to the sheet may be provided in the first intersection section. Accordingly, the second wire-like transmission member is hardly detached from the sheet in the first intersection section.

(3) In the wiring member according to (1), the second wire-like transmission member may not be fixed to the sheet in the first intersection section. Also in this case, the second wire-like transmission member is pressed by the plurality of first wire-like transmission members, thereby being hardly detached from the sheet.

(4) In the wiring member according to any one of (1) to (3), at least one of the plurality of first wire-like transmission members may be a large-diameter wire-like transmission member thicker than the second wire-like transmission member. Accordingly, the second wire-like transmission member is pressed by the large-diameter wire-like transmission member, thus is more hardly detached from the sheet.

(5) In the wiring member according to any one of (1) to (4), a covering layer of each of the plurality of first wire-like transmission members and the second wire-like transmission member may be fused to the sheet. Accordingly, the plurality of first wire-like transmission members and the second wire-like transmission member are simply fixed to the sheet.

(6) In the wiring member according to any one of (1) to (5), it is also applicable that at least one of the plurality of first wire-like transmission member intersects with the plurality of the second wire-like transmission members, defined as a second intersection section is a section of connecting, by the first wire-like transmission member, intersection parts located on both ends of the first wire-like transmission member in a longitudinal direction in at least one wire-like transmission member, the at least one first wire-like transmission member is fixed to the sheet at a plurality of positions at intervals along the longitudinal direction of the first wire-like transmission member, and a length dimension of the second intersection section is smaller than a maximum fixation interval except for the second intersection section in a fixation interval of the first wire-like transmission member. Accordingly, increase in the fixation interval of the first wire-like transmission member in the second intersection section is suppressed, and the first wire-like transmission member is also hardly detached from the sheet.

(7) In the wiring member according to (6), a fixation interval including the second intersection section in the fixation interval of the first wire-like transmission member may be smaller than a maximum fixation interval except for the second intersection section. Accordingly, increase in the fixation interval of the first wire-like transmission member in the second intersection section is suppressed, and the first wire-like transmission member is also hardly detached from the sheet.

(8) In the wiring member according to any one of (1) to (7), it is applicable that the at least two of the plurality of first wire-like transmission members are parallelly arranged in a parallel section, and the second wire-like transmission member intersects with the at least two of the plurality of first wire-like transmission members in the parallel section. Accordingly, a length dimension of the first intersection section can be reduced.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
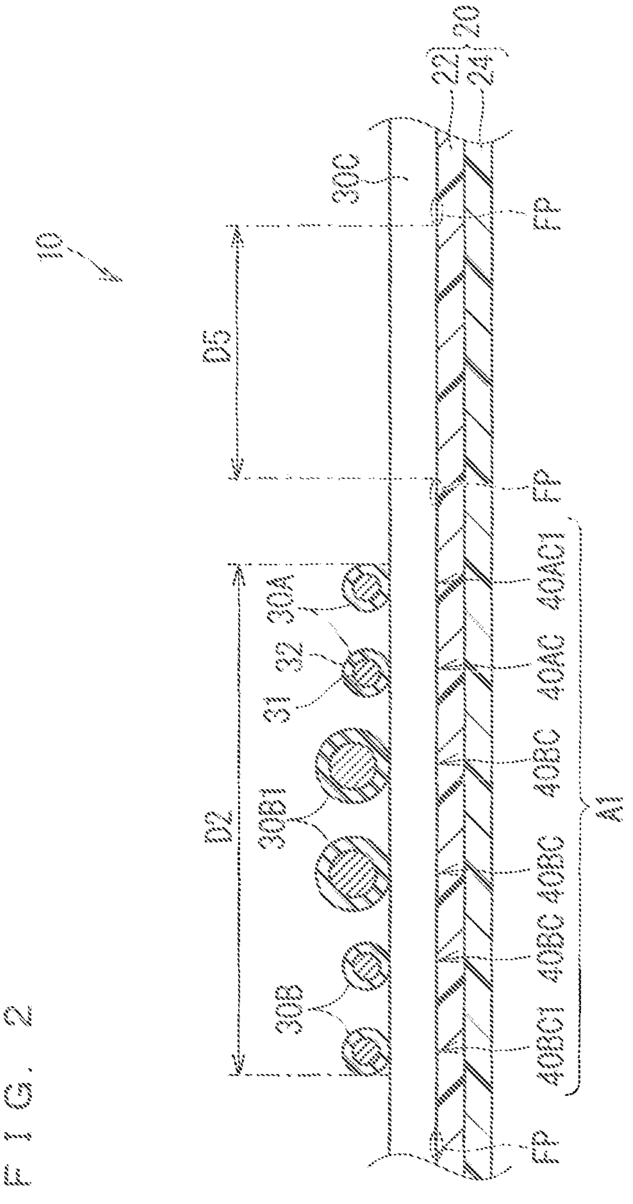
FIG. 2 is a cross-sectional view of the wiring member cut along a II-II line in FIG. 1.

A wiring member according to an embodiment 1 is described hereinafter. FIG. 1 is a plan view illustrating a wiring member 10 according to the embodiment 1. FIG. 2 is a cross-sectional view of the wiring member cut along a II-II line in FIG. 1. A portion illustrated by a virtual line in FIG. 1 and FIG. 2 is a fixing part FP.

The wiring member 10 includes a sheet 20 and a plurality of wire-like transmission members 30. The plurality of wire-like transmission members 30 are fixed to the sheet 20. The sheet 20 is formed into a flat shape as a whole. The plurality of wire-like transmission members 30 are fixed to the sheet 20, thus the wiring member 10 is kept in a flat state.

The sheet 20 needs only fix the plurality of wire-like transmission members 30, thus a material and a structure, for example, are not particularly limited. With regard to a material constituting the sheet 20, the sheet 20 is formed of a resin material herein. A material other than resin such as metal or an inorganic material, for example, may be used for the material constituting the sheet 20. With regard to the structure of the sheet 20, the sheet 20 has a double layer structure herein. The structure of the sheet 20 may be a single layer structure, or a multilayer structure of three or more layers is also applicable.

The sheet 20 includes a first layer 22 and a second layer 24. The first layer 22 is a fusion layer. The wire-like transmission member 30 is fused and fixed to the fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example. One surface of the first layer 22 is one main surface of the sheet 20.

The second layer 24 is formed of a material different from that of the fusion layer, or has a different structure. The second layer 24 increases a function of the fusion layer, or adds a function which the fusion layer does not have to the sheet 20. A material constituting the second layer 24 is a material described for the fusion layer described above, metal, or an inorganic material, for example. A structure of the second layer 24 may be any of the structure described for the fusion layer described above. One surface of the second layer 24 is the other main surface of the sheet 20.

The first layer 22 and the second layer 24 are fixed to each other while the other surface of the first layer 22 and the other surface of the second layer 24 have contact with each other. A fixing state of the first layer 22 and the second layer 24 is not particularly limited, however, fixing by fusion or adhesion is preferable. For example, when at least one of the first layer 22 and the second layer 24 is a sheet having voids in a surface such as a fibrous material sheet or a foam sheet, a resin material or an adhesive agent enters the voids and the layers can be fixed to each other. Such a configuration causes so-called anchor effect, thus the first layer 22 and the second layer 24 are rigidly fixed.

In the description herein, the first layer 22 is a solid sheet made of resin and the second layer 24 is a fibrous material sheet. In the description herein, the first layer 22 and the second layer 24 are fused to each other. That is to say, the resin of the first layer 22 enters between the fibers of the second layer 24 while having flowability, and is then hardened. Maintained accordingly is a state where the resin of the first layer 22 enters between the fibers of the second layer 24, and the first layer 22 and the second layer 24 are rigidly fixed to each other.

The first layer 22 and the second layer 24 are formed to have the same size (the same planar shape). One of the first layer 22 and the second layer 24 may also be formed to be larger than the other one thereof. The first layer 22 and the second layer 24 are wholly fixed at a region where they have contact with each other. The first layer 22 and the second layer 24 may also be fixed only at a part of a region where they have contact with each other.

The sheet 20 may be a flexible member. For example, the first layer 22 is a solid sheet made up of flexible resin such as flexible PVC as a material, the second layer 24 is a non-woven cloth made up of PET as a material, and the sheet 20 is a flexible member. For example, the sheet 20 may have a plastic property so as to be able to follow bending of the wire-like transmission member 30. It is also applicable that the wiring member 10 can be bended in a thickness direction (bending so that a fold line follows the main surface of the sheet 20).

The plurality of wire-like transmission members 30 are wire-like members transmitting electrical power or light, for example. The plurality of wire-like transmission members 30 are assumed to be members connecting components in a vehicle. A connector C, for example, is provided on an end portion of the wire-like transmission member 30. This connector C is connected to a connector provided in the other side component, thus the wire-like transmission member 30 is connected to the other side component. That is to say, the present wiring member 10 is used as the wiring member 10 electrically connecting various types of component in a vehicle, for example (or connecting them so that they can perform optical communication). The connector C may be fixed to the sheet 20.

Routes of the plurality of wire-like transmission members 30 are set in accordance with a position of a component to which the wire-like transmission members 30 are connected. The plurality of wire-like transmission members 30 are fixed to the sheet 20, thus the plurality of wire-like transmission members 30 are kept in a form following a wiring route corresponding to a position of a component as a connection destination of each wire-like transmission member 30. The route of the plurality of wire-like transmission members 30 may be made up of a combination of a straight route and a bending route. The sheet 20 may also be made up of a combination of a straight route and a bending route. The plurality of wire-like transmission members 30 may be fixed to the sheet 20 in a state of partially branched. The sheet 20 may also be formed into a branched shape. Herein, the plurality of wire-like transmission members 30 are bended on the sheet 20. The plurality of wire-like transmission members 30 are branched on the sheet 20.

The wire-like transmission member 30 includes a transmission wire body 31 and a covering layer 32. The transmission wire body 31 is a portion transmitting electrical power or light. When the wire-like transmission member 30 is an electrical wire, the transmission wire body 31 is a conductor core wire. The conductor core wire is made up of one or a plurality of strands. The strand is formed of copper, copper alloy, aluminum, or aluminum alloy as a material, for example. When the wire-like transmission member 30 is an optical fiber, the transmission wire body 31 is a core and a clad. The covering layer 32 is a layer covering the transmission wire body 31. A resin material constituting the covering layer 32 is not particularly limited, but can be appropriately set. For example, the wire-like transmission member 30 may be a general wire having a core wire and a covering layer around the core wire, or may also be a shield wire, a twisted wire, an enamel wire, a nichrome wire, or an optical fiber.

The wire-like transmission member 30 transmitting the electrical power may be various kinds of signal lines or various kinds of power lines. Some of the wire-like transmission members 30 transmitting the electrical power may be used as an antenna or coil, for example, transmitting or receiving a signal or electrical power to or from a space.

The wire-like transmission member 30 may be a single core wire. The single core wire is a single wire-like object. The single core wire is the wire-like transmission member 30 with one transmission route. The wire-like transmission member 30 may be a multicore wire. The multicore wire is a compound body of a plurality of wire-like objects. The single core wire is the wire-like transmission member 30 with a plurality of transmission routes. The multicore wire may be a cable made up of collected twisted wires or a plurality of wire-like objects covered by a sheath, for example.

Herein, the wire-like transmission member 30 is fused and fixed to the sheet 20. In this case, an outermost layer of the wire-like transmission member 30 and a fusion layer are fused to each other. An outermost layer of the wire-like transmission member 30 is a covering layer 32. The covering layer 32 is made up of a material which can be fused to the fusion layer. A resin material constituting the covering layer 32 and a resin material constituting the fusion layer are the same type of material. A resin material constituting the fusion layer and a resin material constituting the covering layer 32 are PVC or polyolefin, for example. However, a fixing state of the wire-like transmission member 30 and the sheet 20 is not limited to fusion. The fixing state other than fusion is described in detail in modification examples described hereinafter.

The wire-like transmission member 30 is fixed to the sheet 20 at a plurality of positions at intervals along the extension direction. The plurality of fixing parts FP where the sheet 20 and the wire-like transmission member 30 are fixed are provided at intervals along the extension direction of the wire-like transmission member 30. The interval between the fixing parts FP is not particularly limited, but can be appropriately set.

Herein, eight wire-like transmission members 30 are included. The eight wire-like transmission members 30 are divided into two wire-like transmission members 30A, four wire-like transmission members 30B, and two wire-like transmission members 30C. One ends of the wire-like transmission members 30A and 30B are connected to the same connector C. The other ends of the wire-like transmission members 30A and 30B are connected to different connectors C. The wire-like transmission members 30A and 30B are branched in a midway portion from one ends to the other ends. Six wire-like transmission members 30 are parallelly arranged in a parallel section where the wire-like transmission members 30A and 30B are parallelly arranged. The wire-like transmission members 30A and 30B are one example of the plurality of first wire-like transmission members parallelly arranged in at least a part of the parallel section on the sheet 20.

The wire-like transmission member 30C intersects with each of the wire-like transmission members 30A and 30B in an intersection region A1. The intersection region A1 is located in a parallel section where the wire-like transmission members 30A and 30B are parallelly arranged. The wire-like transmission member 30C is an example of the second wire-like transmission member intersecting with the plurality of first wire-like transmission members in the parallel section. Both end portions of the wire-like transmission member 30C are connected to the connector C different from the connectors C to which the wire-like transmission members 30A and 30B are connected. At least one end portion of the wire-like transmission member 30C may be connected to the same connector C as the connectors C to which the wire-like transmission members 30A and 30B are connected.

In the present specification, a portion where two wire-like transmission members 30 intersect with each other on the sheet 20 is referred to as an intersection part 40. A portion where two wire-like transmission m s 30A and 30B intersect with each other is referred to as an intersection part 40AC in some cases hereinafter. A portion where two wire-like transmission members 30B and 30C intersect with each other is referred to as an intersection part 40BC in some cases. One of the two wire-like transmission members 30 constituting one intersection part 40 located on a side of the sheet 20 is referred to as a lower side wire-like transmission member, and the other one of the two wire-like transmission members 30 is referred to as an upper side wire-like transmission member in some cases.

In the example illustrated in FIG. 1, eight intersection parts 40 in twelve intersection parts 40 in the intersection region A1 are intersection parts 40AC, and four Intersection parts 40 are intersection parts 40BC. The wire-like transmission members 30A and 30B intersects with the wire-like transmission member 30C to be branched in the intersection region A1. The wire-like transmission members 30A and 30B and the wire-like transmission member 30C extend in different directions in both sides of the intersection region A1. The wire-like transmission members 30A and 30B and the wire-like transmission member 30C may be parallelly arranged in any one side of the intersection region A1.

A section where one wire-like transmission member 30 intersects with one of the plurality of the other wire-like transmission members 30 in one intersection region A1 is referred to as an intersection section. A section where one wire-like transmission member 30 intersects with the other plurality of wire-like transmission members 30 in one intersection region A1 is defined as follows. The plurality of intersection parts 40 are formed between one wire-like transmission member 30 and the other plurality of wire-like transmission members 30. Two intersection parts located on an outermost side (both ends) along the longitudinal direction of one wire-like transmission member 30 in the plurality of intersection parts 40 are referred to as large outer intersection parts. A section where these two large outer intersection parts are connected by one wire-like transmission member 30 is an intersection section in a case where one wire-like transmission member 30 intersects with the other plurality of wire-like transmission members 30 in one intersection region A1. A length dimension of the intersection section at this time is a length dimension in which a central axis of the one wire-like transmission member 30 extends between outer edges of two large outer intersection parts.

For example, one wire-like transmission member 30C intersects with six wire-like transmission members 30A and 30B in the intersection region A1 to form six intersection parts 40AC and 40BC. As illustrated in FIG. 1, the large outer intersection parts in six intersection parts 40AC and 40BC are intersection parts 40AC1 and 40BC1. A section where two large outer intersection parts 40AC1 and 40BC1 are connected by one wire-like transmission member 30C in one wire-like transmission member 30C is the intersection section. Herein, the intersection section of the wire-like transmission member 30C is an example of the first intersection section. When the plurality of first wire-like transmission members 30A and 30B are located and are not parallelly arranged in the intersection region A1, a dimension where two intersection parts located on both ends of second wire-like transmission member 30C in the longitudinal direction are connected by the second wire-like transmission member 30C is referred to as a first intersection section.

In the similar manner, the intersection section of the wire-like transmission member 30A is a section where two wire-like transmission members 30C and two intersection parts 40AC are connected by the wire-like transmission member 30A. The intersection section of the wire-like transmission member 30A is an example of a second intersection section. The Intersection section of the wire-like transmission member 30B is a section where two intersection parts 40BC where two wire-like transmission members 30C and two intersection parts 40BC intersect with each other are connected by the wire-like transmission member 30B. The intersection section of the wire-like transmission member 30B is an example of the second intersection section. When the plurality of first wire-like transmission members 30A and 30B are not parallelly arranged in the intersection region A1, a dimension in which two intersection parts located on both ends of each of the first wire-like transmission members 30A and 30B are connected by the first wire-like transmission members 30A and 30B is the second intersection section. A length dimension of the intersection section (second intersection section) of the wire-like transmission members 30A and 30B is a dimension D1 in FIG. 1. A length dimension of the intersection section (first intersection section) of the wire-like transmission member 30C is a dimension D2 in FIG. 1 and FIG. 2.

A maximum fixation interval in a straight section except for the intersection section in the fixation interval of the wire-like transmission member 30 is a maxim fixation interval. When the sheet 20 and the wire-like transmission member 30 are fused and fixed to each other, the fixation interval is a dimension between inner edges of two fixing parts FP. The fixation interval is a length dimension of a part of the wire-like transmission member 30 which is not fixed to the sheet 20 between two fixing parts FP. For example, the maximum fixation interval of the wire-like transmission member 30A is a dimension D3 in FIG. 1. For example, the maximum fixation interval of the wire-like transmission member 30B is a dimension D4 in FIG. 1. For example, the maximum fixation interval of the wire-like transmission member 30C is a dimension D5 in FIG. 1 and FIG. 2.

A length dimension of the intersection section (first intersection section) of the wire-like transmission member 30C is larger than the maximum fixation interval of the wire-like transmission member 30C. Specifically, as illustrated in FIG. 1 and FIG. 2, the dimension D2 is larger than the dimension D5. In the case where the plurality of second wire-like transmission members 30C are located, there is a case where at least one of the length dimension of the first intersection section and/or the maximum fixation interval is different when the plurality of second wire-like transmission members 30C are compared. In this case, it is sufficient that the length dimension of the first intersection section is larger than the maximum fixation interval in each second wire-like transmission member 30C. The length dimension of the first intersection section of one second wire-like transmission member 30C may be equal to or smaller than the maximum fixation interval of the other one second wire-like transmission member 30C. There is also a case where one second wire-like transmission member 30C intersects with the plurality of first wire-like transmission members 30A and 30B in each of the plurality of intersection regions. In this case, one second wire-like transmission member 30C includes the plurality of first intersection sections, and it is sufficient that the length dimension of each of the plurality of first intersection sections is larger than the maximum fixation interval of one wire-like transmission member 30C.

The wire-like transmission members 30A and 30B are the upper side wire-like transmission members, and the wire-like transmission member 30C is the lower side wire-like transmission member in one intersection section of the wire-like transmission member 30C. Accordingly, the second wire-like transmission member is located closer to the side of the sheet 20 in relation to the plurality of first wire-like transmission members.

At least one of six wire-like transmission members 30A and 30B as the first wire-like transmission member is the large diameter wire-like transmission member thicker than the wire-like transmission member 30C as the second wire-like transmission member. Herein, two wire-like transmission members 30B1 in four wire-like transmission members 30B are the large diameter wire-like transmission members.

In the example illustrated in FIG. 2, each of the wire-like transmission mem 30B1 and the wire-like transmission member 30C is a general electrical wire with a single core. A conductor cross-sectional area of the wire-like transmission member 30B1 is larger than that of the wire-like transmission member 30C, thus the wire-like transmission member 30B1 is thicker than the wire-like transmission member 30C. The structure that the large diameter wire-like transmission member is thicker than the wire-like transmission member 30C is not particularly limited, but can be appropriately set. For example, it is also applicable that the large diameter wire-like transmission member is a shield wire including a shield layer, thus the large diameter wire-like transmission member is thicker than the wire-like transmission member 30C. For example, it is also applicable that the large diameter wire-like transmission member is a multi-core wire, thus the large diameter wire-like transmission member is thicker than the wire-like transmission member 30C.

That is to say, the thickness of the wire-like transmission member 30 is determined by a multiple combination of a plurality of conditions such as the member of the cores of the wire-like transmission members 30, a layer structure of the wire-like transmission member 30 as the core, and a thickness of each layer, for example. The large diameter wire-like transmission member has conditions different from the wire-like transmission member 30C, this is thicker than the wire-like transmission member 30C.

The sheet 20 and the wire-like transmission member 30 are not fixed to each other in the intersection section. The fixing part FP is not provided in the intersection section. The sheet 20 and the wire-like transmission member 30 may be fixed to each other in the Intersection section.

The length dimension of the second intersection section of the wire-like transmission member 30A is smaller than the maximum fixation interval of the wire-like transmission member 30A. Specifically, as illustrated in FIG. 1, the dimension D1 is smaller than the dimension D3. In the similar manner, the length dimension of the second intersection section of the wire-like transmission member 30B is smaller than the maximum fixation interval of the wire-like transmission member 30B. Specifically, as illustrated in FIG. 1, the dimension D1 is smaller than the dimension D4. Accordingly, the wire-like transmission members 30A and 30B is hardly detached from the sheet 20 even when they are the upper side wire-like transmission members in the second intersection section. In the case where the plurality of first wire-like transmission members 30A (30B) are located, there is a case where at least one of the length dimension of the second intersection section and/or the maximum fixation interval is different when the plurality of first wire-like transmission members 30A (30B) are compared. In this case, it is sufficient that the length dimension of the second intersection section is smaller than the maximum fixation interval in each first wire-like transmission member 30A (30B). The length dimension of the first intersection section of one first wire-like transmission member 30A (30B) may be equal to or larger than the maximum fixation interval of the other one first wire-like transmission member 30A (30B). There is also a case where one first wire-like transmission member 30A (30B) intersects with the plurality of second wire-like transmission members 30C in each of the plurality of intersection regions. In this case, one first wire-like transmission member 30A (30B) includes the plurality of second intersection sections, and it is sufficient that the length dimension of each of the plurality of second intersection sections is smaller than the maximum fixation interval of one wire-like transmission member 30A (30B).

The wire-like transmission members 30A. 30B, and 30C extend straight in a section including the intersection part 40. The wire-like transmission members 30A, 30B, and 30C may extend to be bended in a section including the intersection part 40.

The wire-like transmission members 30A and 30B are perpendicular to the wire-like transmission member 30C in the intersection section. The wire-like transmission n embers 30A and 30B may obliquely intersect with the wire-like transmission member 30C in the intersection section. When the wire-like transmission members 30A and 30B obliquely intersect with the wire-like transmission member 30C in the intersection section, the intersection section is longer than that in the case they are perpendicular to each other.

<Effect Etc. Of Embodiment 1>

When the fixation interval increases in the wire-like transmission member 30, a portion between the fixing parts PP is easily detached from the sheet 20. It is difficult to fix the upper side wire-like transmission member to the sheet 20 in the intersection section. Thus, when the wire-like transmission member 30 having the long intersection section serves as the upper side wire-like transmission member, the wire-like transmission member 30 is easily detached from the sheet 20. In the meanwhile, according to the wiring member 10 described above, a length dimension D2 of the intersection section (first intersection section) is larger than the maximum fixation interval D5 except for at least the first intersection section in the fixation interval with the sheet 20 in the wire-like transmission member 30C, and the wire-like transmission member 30C serves as the lower side wire-like transmission member. Accordingly, the wire-like transmission member 30C is more hardly detached from the sheet 20 than the case where the wire-like transmission member 30C serves as the upper side wire-like transmission member in the intersection section.

The wire-like transmission member 30C is not fixed to the sheet 20 in the first intersection section. Also in this case, the wire-like transmission member 30C is pressed by the plurality of wire-like transmission members 30A and 30B, thereby being hardly detached from the sheet 20.

The wire-like transmission member 30C is pressed by the wire-like transmission member 30B1 having a large diameter, thereby being hardly detached from the sheet 20.

The covering layer 32 of each of the plurality of wire-like transmission members 30 are fused to the sheet 20. Accordingly, the plurality of wire-like transmission members 30 are simply fixed to the sheet 20.

The length dimension D1 of the intersection section (second intersection section) of the wire-like transmission members 30A and 30B is smaller than the maximum fixation intervals D3 and D4 except for at least the second intersection section in the fixation interval of the first wire-like transmission members 30A and 30B. Accordingly, increase in the fixation interval of the first wire-like transmission members 30A and 30B in the second intersection section is suppressed, and the first wire-like transmission members 30A and 30B are also hardly detached from the sheet.

At least two first wire-like transmission members 30A and 30B are parallelly arranged in the parallel section, and the second wire-like transmission member 30C intersects with at last two first wire-like transmission members 30A and 30B in the parallel section. Accordingly, the length dimension D2 of the first intersection section can be reduced. However, the second wire-like transmission member 30C may intersect with at least two first wire-like transmission members 30A and 30B in a section which is not the parallel section.

Modification Example

Figure 3:
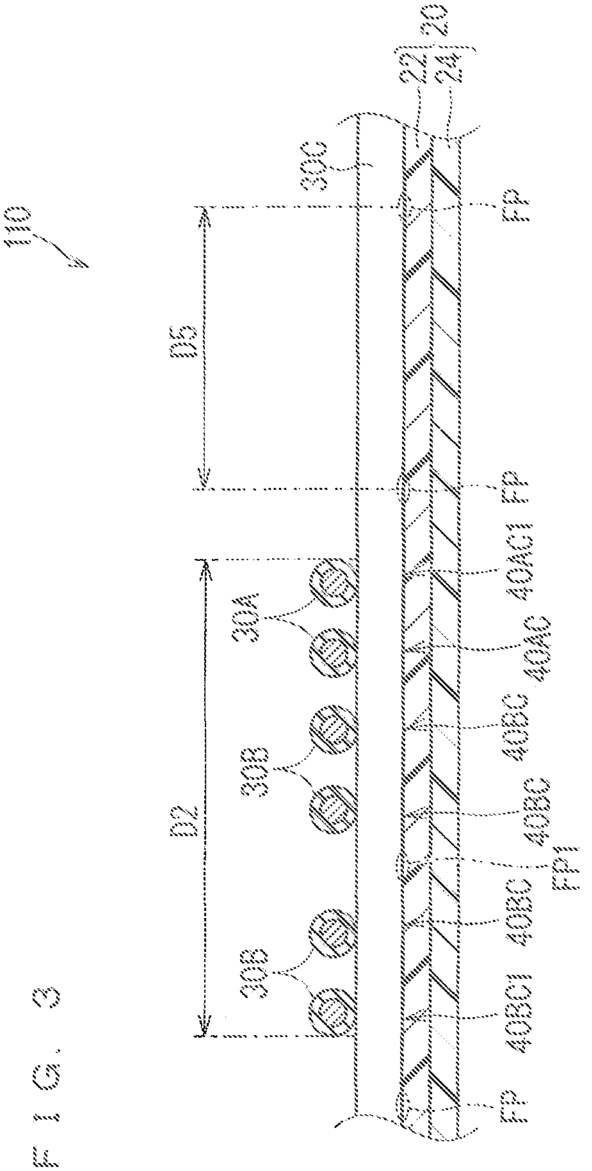
FIG. 3 is a cross-sectional view illustrating a modification example of the wiring member.

FIG. 3 is a cross-sectional view illustrating a modification example of the wiring member 10.

A wiring member 110 illustrated in FIG. 3 is different from the wiring member 10 described above in that a position where the second wire-like transmission member is fixed to the sheet 20 is provided in the intersection section. According to such a wiring member 110, the position where the second wire-like transmission member is fixed to the sheet 20 is provided in the intersection section, thus the second wire-like transmission member is more hardly detached from the sheet 20.

Specifically, as illustrated in FIG. 3, a fixing part FP1 is provided between two intersection parts 40AC1 and 40BC1 in the wire-like transmission member 30C. In the example illustrated in FIG. 3, the fixing part PPI is provided in a part of the wire-like transmission member 30C between the upper side wire-like transmission members. The fixing part EPI may be provided in the other portion. An interval between the upper side wire-like transmission members located on both sides of the fixing part FP1 is larger than that between the other upper side wire-like transmission members. The interval between the upper side wire-like transmission members located on both sides of the fixing part FP1 may not be larger than that between the other upper side wire-like transmission members. The fixing part FP may be provided in a part of the wire-like transmission member 30C overlapped with the upper side wire-like transmission member.

The large diameter wire-like transmission member is not provided in the upper side wire-like transmission member in the wiring member 110. The wire-like transmission members 30A and 30B are wire-like transmission members equal to or thinner than the wire-like transmission member 30C. In this case, force of the wire-like transmission members 30A and 30B pressing the wire-like transmission member 30C is small compared with a case where the large diameter wire-like transmission member is provided. The fixing part FP1 is preferably provided in such a case.

A fixation interval including the second intersection section (an interval between the fixing part FP on the left side and the fixing part FP on the right side with respect to a line indicating the dimension D1 in FIG. 1) in the fixation interval between the first wire-like transmission members 30A and 30B may be smaller than the maximum fixation intervals D3 and DA except for the second intersection section. Accordingly, increase in the fixation interval of the first wire-like transmission members 30A and 30B in the second intersection section is suppressed, and the first wire-like transmission members 30A and 30B are also hardly detached from the sheet.

In the above description, the intersection region A1 is provided so that the plurality of wire-like transmission members 30 are branched, however, this configuration is not necessary. The intersection region may be provided to change an arrangement order of the plurality of wire-like transmission members 30. In this case, it is sufficient that two wire-like transmission members 30 constituting the intersection part are parallelly arranged in both sides of the intersection part.

In the above description, one intersection region A1 is provided in the wiring members 10 and 110, however, this configuration is not necessary. The plurality of intersection regions may be provided in the wiring member. Herein, focusing on a relationship between the length of the intersection section in the upper side wire-like transmission member and the maximum fixation interval and a relationship between the length of the intersection section in the lower side wire-like transmission member and the maximum fixation interval, the intersection region is divided into four intersection regions.

A first intersection region is an intersection region in which a length of the intersection section in the upper side wire-like transmission member is equal to or smaller than the maximum fixation interval, and a length of the intersection section in the lower side wire-like transmission member is larger than the maximum fixation interval. For example, the intersection region A1 described above is the first intersection region.

A second intersection region is an intersection region in which a length of the intersection section in the upper side wire-like transmission member is equal to or smaller than the maximum fixation interval, and a length of the intersection section in the lower side wire-like transmission member is equal to or smaller than the maximum fixation interval. For example, an intersection region in a case where both the number of the upper side wire-like transmission members and the number of the lower wire-like transmission members are small is the second intersection region.

A third intersection region is an intersection region in which a length of the intersection section in the upper side wire-like transmission member is longer than the maximum fixation interval, and a length of the intersection section in the lower side wire-like transmission member is equal to or smaller than the maximum fixation interval. For example, an intersection region in which the upper side wire-like transmission member and the lower side wire-like transmission member in the intersection region A1 described above are replaced with each other is a third intersection region.

A fourth intersection region is an intersection region in which a length of the intersection section in the upper side wire-like transmission member is longer than the maximum fixation interval, and a length of the intersection section in the lower side wire-like transmission member is longer than the maximum fixation interval. For example, an intersection region in a case where both the number of the upper side wire-like transmission members and the number of the lower wire-like transmission members are large is the fourth intersection region.

When the plurality of intersection regions are provided in the wiring member, some or all of the intersection regions are preferably the first intersection region. Accordingly, the detachment of the second wire-like transmission member can be suppressed in the first intersection region. When some of the plurality of intersection regions are the first intersection region, the intersection region other than the first intersection region is preferably the second intersection region. Accordingly, the detachment of the wire-like transmission member 30 can be suppressed in the plurality of intersection regions. There may be a case where the third intersection region or the fourth intersection region is provided in the wiring member.

A member suppressing the detachment of the wire-like transmission member 30 may be provided in the intersection region. For example, the member suppressing the detachment of the wire-like transmission member 30 may be a cover sheet covering the intersection region. For example, the member suppressing the detachment of the wire-like transmission member 30 may be a joint member such as an adhesive agent or a gluing agent bonding the upper side wire-like transmission member and the lower side wire-like transmission member.

When the plurality of intersection regions are provided in the wiring member, one wire-like transmission member 30 may constitute an intersection part in a plurality of intersection regions. One wire-like transmission member 30 may constitute the upper side wire-like transmission member in an intersection part in a plurality of intersection regions. One wire-like transmission member 30 may constitute the lower side wire-like transmission member in an intersection part in a plurality of intersection regions. It is also applicable that one wire-like transmission member 30 constitutes the upper side wire-like transmission member in an intersection part in one intersection region, and constitutes the lower side wire-like transmission member in an intersection part in the other intersection region. For example, the wire-like transmission members 30A and 30B described above may constitute the upper side wire-like transmission members of the lower side wire-like transmission member in the intersection part in the intersection region different from the intersection region A1. For example, the wire-like transmission member 30C described above may constitute the lower side wire-like transmission members or the upper side wire-like transmission member in the intersection part in the intersection region different from the intersection region A1.

As described above, applicable as the fixing state of the sheet 20 and the wire-like transmission member 30 is fusion fixation, or a fixing state other than the fusion fixation is also applicable. Applicable as the fixing state of the sheet 20 and the wire-like transmission member 30 are a contact area fixation and a non-contact area fixation, or both fixations may be used together. Herein, the contact area fixation indicates that a portion where the sheet 20 and the wire-like transmission member 30 have contact with each other is stuck and fixed. The non-contact area fixation is a fixing stat e which is not the contact area fixation, and indicates that a sewing thread, a cover, or an adhesive tape presses the wire-like transmission member 30 toward the sheet 20 or sandwiches the sheet 20 and the wire-like transmission member 30 to keep them in a fixing state.

Applicable as the configuration of the contact area fixation are a contact area indirect fixation and a contact area direct fixation, or both fixations may also be used together in different regions. Herein, the contact area indirect fixation indicates that the sheet 20 and the wire-like transmission member 30 are indirectly stuck and fixed via an adhesive agent, a gluing agent, and a double-sided adhesive tape provided therebetween. The contact area direct fixation indicates that the sheet 20 and the wire-like transmission member 30 are directly stuck and fixed without an intervention of the adhesive agent, for example, which is separately provided. Considered in the contact area direct fixation is that resin included in at least one of the sheet 20 and the wire-like transmission member 30 is melted, thus the sheet 20 and the wire-like transmission member 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as fusion can be used. For example, when the contact area direct fixation by heat is formed by fusion, adoptable are various types of fusion means such as ultrasonic fusion, heating pressurizing fusion, hot air fusion, and high-frequency fusion. When the state of the contact area direct fixation is formed by these means, the sheet 20 and the wire-like transmission member 30 are in the state of the contact area direct fixation by these means. Specifically, when the state of the contact area direct fixation is formed by the ultrasonic fusion, for example, the sheet 20 and the wire-like transmission member 30 are in the state of the contact area direct fixation by the ultrasonic fusion. Accordingly, the fusion fixation described above is one aspect of the contact area direct fixation.

The configurations described in the embodiments and modification examples thereof can be appropriately combined as long as they are not contradictory.

EXPLANATION OF REFERENCE SIGNS

10, 110 wiring member
20 sheet
22 first layer
24 second layer
30 wire-like transmission member
30A, 30B wire-like transmission member (first wire-like transmission member)
30B1 large diameter wire-like transmission member
30C wire-like transmission member (second wire-like transmission member)
31 transmission wire body
32 covering layer
40, 40AC, 40AC1, 40BC, 40BC1 intersection part
A1 intersection region
C connector
FP fixing part

The invention claimed is:

1. A wiring member, comprising:
a sheet;
a plurality of first wire-like transmission members disposed on the sheet; and
at least one second wire-like transmission member intersecting with at least two of the plurality of first wire-like transmission members, wherein
defined as a first intersection section is a section of connecting, by the second wire-like transmission member, two intersection parts located on both ends of the second wire-like transmission member in a longitudinal direction in at least two intersection parts in which each of the at least two of the plurality of first wire-like transmission members intersect with the second wire-like transmission member,
the second wire-like transmission member is fixed to the sheet at a plurality of positions at intervals along the longitudinal direction,
a length dimension of the first intersection section is larger than a maximum fixation interval except for the first intersection section in a fixation interval of the second wire-like transmission member, and
the second wire-like transmission member is located closer to a side of the sheet in relation to the at least two of the plurality of first wire-like transmission members in the first intersection section.

2. The wiring member according to claim 1, wherein a portion where the second wire-like transmission member is fixed to the sheet is provided in the first intersection section.

3. The wiring member according to claim 1, wherein the second wire-like transmission member is not fixed to the sheet in the first intersection section.

4. The wiring member according to claim 1, wherein at least one of the plurality of first wire-like transmission members is a large-diameter wire-like transmission member thicker than the second wire-like transmission member.

5. The wiring member according to claim 1, wherein a covering layer of each of the plurality of first wire-like transmission members and the second wire-like transmission member is fused to the sheet.

6. The wiring member according to claim 1, wherein at least one of the plurality of first wire-like transmission member intersects with the plurality of the second wire-like transmission members, defined as a second intersection section is a section of connecting, by the first wire-like transmission member, intersection parts located on both ends of the first wire-like transmission member in a longitudinal direction in at least one wire-like transmission member, the at least one first wire-like transmission member is fixed to the sheet at a plurality of positions at intervals along the longitudinal direction of the first wire-like transmission member, and a length dimension of the second intersection section is smaller than a maximum fixation interval except for the second intersection section in a fixation interval of the first wire-like transmission member.

7. The wiring member according to claim 6, wherein a fixation interval including the second intersection section in the fixation interval of the first wire-like transmission member is smaller than a maximum fixation interval except for the second intersection section.

8. The wiring member according to claim 1, wherein the at least two of the plurality of first wire-like transmission members are parallelly arranged in a parallel section, and the second wire-like transmission member intersects with the at least two of the plurality of first wire-like transmission members in the parallel section.

* * * * *